April 6, 1926.
G. E. WILLERS
DOUBLE STROKE DEEP WELL PUMP
Filed June 16, 1924
1,579,587
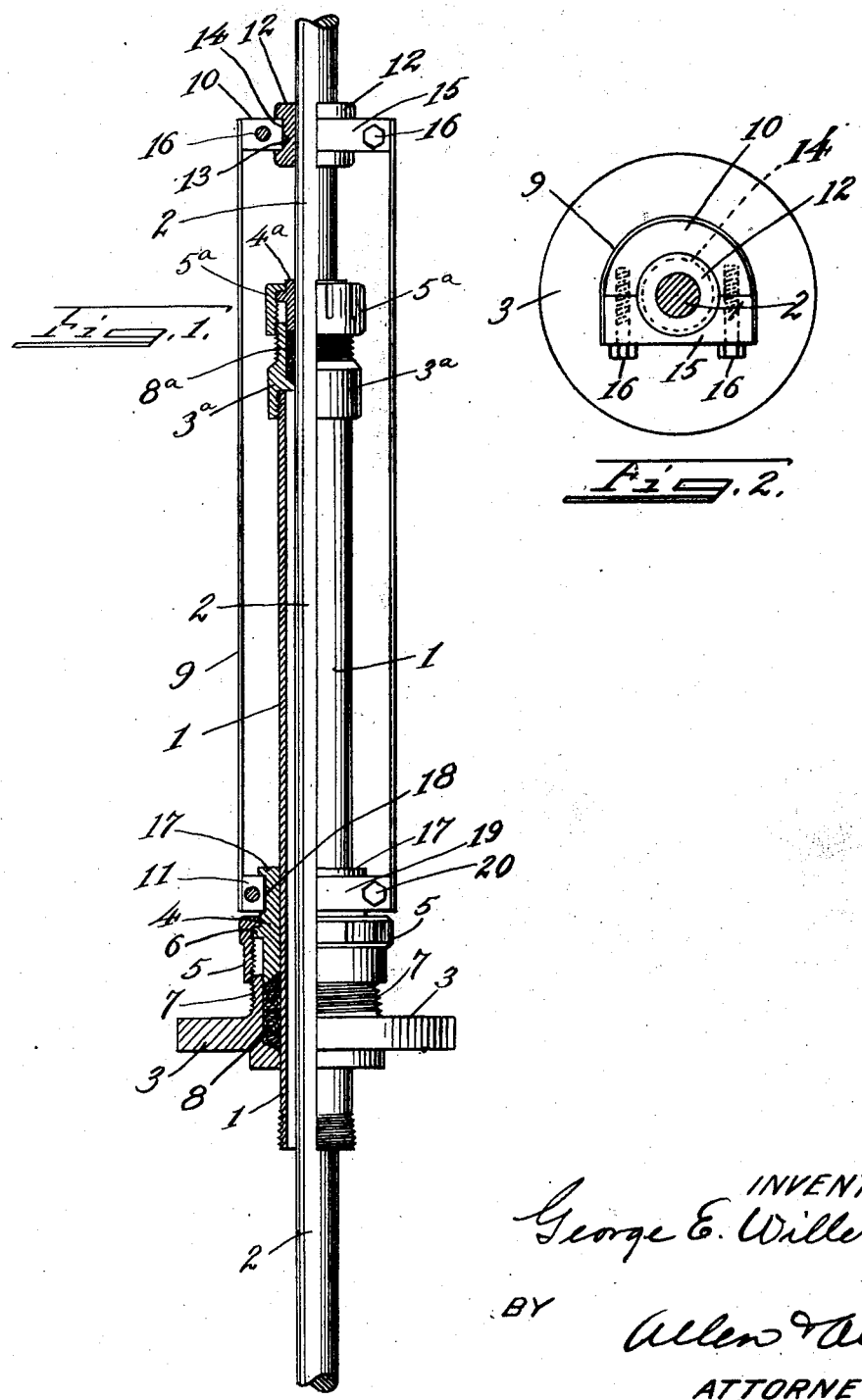
INVENTOR:
George E. Willers
BY
Allen & Allen
ATTORNEYS.

Patented Apr. 6, 1926.

1,579,587

UNITED STATES PATENT OFFICE.

GEORGE E. WILLERS, OF LAWRENCEBURG, INDIANA, ASSIGNOR TO A. D. COOK, INC., OF LAWRENCEBURG, INDIANA, A CORPORATION OF INDIANA.

DOUBLE-STROKE DEEP-WELL PUMP.

Application filed June 16, 1924. Serial No. 720,192.

*To all whom it may concern:*

Be it known that I, GEORGE E. WILLERS, a citizen of the United States, and a resident of Lawrenceburg, in the county of Dearborn and State of Indiana, have invented certain new and useful Improvements in Double-Stroke Deep-Well Pumps, of which the following is a full, clear, and exact description, reference being had to the accompanying drawings, forming part of this specification.

My invention relates to a mechanical means for preventing the water leakage from the packing boxes on the plunger rods from getting into the oil reservoir and on the movable and lubricated parts of the machine, and consists of a water baffle placed over the packing boxes of both inside and outside plunger rod packing boxes in such a manner as to divert any water leakage away from the crank shaft and crank journals and other bearings and movable parts designed to operate the plungers.

It has been found that water from leaky packing boxes on the plungers will flow down along the adjacent parts and eventually find its way into the bearings and oil reservoirs of the operating mechanism, where by its higher gravity, it will displace the lubricant and cause the bearings to run dry. To obviate this I have placed a U-shaped baffle or housing around the assembled parts containing the packing boxes, the front of which baffle being open to allow the water to flow in a direction away from the parts intended to shield, and also to admit ready access to the packing boxes for purposes of adjustment.

In the drawings:

Figure 1 is a front elevation of the plunger rods and their packing boxes with the baffle in place, one half of the outside plunger rod and the packing boxes being in longitudinal section to show the manner in which the baffle is attached.

Figure 2 is a plan view of Figure 1 entire.

Referring now to the drawings in detail, I have an outside plunger rod 1, which is tubular and contains the inside plunger rod 2. In practical operation the plungers reciprocate in opposite directions to each other, the inner rod being on the down-stroke when the upper is on the up-stroke.

A packing box 3 is provided on the outer plunger rod which allows the rod to slide therein and has a gland 4, and a nut 5 bearing on a flange 6 on the gland and threaded to receive the threaded portion 7 on the packing box.

The packing box contains some suitable packing material 8, which is compressed by the action of the packing box nut when turned down, and draws the gland into the packing box and thus prevents leakage of fluid between the packing box and the plunger rod.

A packing box of like character and for like purposes, is provided on the upper end of the outer plunger rod and encloses the inner plunger rod, and consists of the packing box 3ª, the gland 4ª, the nut 5ª and the packing 8ª.

The packing box 3ª is threaded to receive the upper end of the outside plunger rod to allow the sliding of the inner plunger rod within the outside plunger rod and prevent leakage of water from the tubular recess of the outside plunger rod.

All the parts referred to in the above explanation are of the type commonly used in pumps of this kind and the continued operation of these parts, the resultant wear and the high pressure under which the water is carried in the well casing and the tubular outside plunger rod, will cause some leakage between the packing boxes and the plunger rods with results as before mentioned.

I have therefore provided a water baffle 9, which is preferably constructed of a piece of sheet metal bent into a U-shaped channel fastened to semi-circular heads 10 and 11 at the respective ends of the channel.

A sleeve 12 is fitted around the inner plunger rod and a circumferential groove 13 is cut in the outer surface of the sleeve to receive the semi-circular opening 14, in the baffle head 10. By means of a clamping piece 15 shaped to fit in the groove 13, and the tap screws 16, the sleeve is enclosed in the head 10 and the upper portion of the baffle is thus slidably secured to the inside plunger rod.

An extension 17 on the gland 4 of the outside plunger rod packing box, has a circumferential groove 18 to receive the inner surface of the baffle head 11, and a suitably shaped clamping piece 19 fastened to the baffle head 11 by means of the tap screws 20 secures the lower end of the baffle to the outside plunger rod packing box assembly.

It will readily be seen that by means of this baffle any leakage from the packing boxes will be directed towards the front of the pump and down along the plunger rod to the ground, passing away harmlessly and clear of the bearings and journals of the operating mechanism. Furthermore, the front of the baffle being open, ready access is had to the inner packing box, while the outside plunger rod packing box being unaffected, these parts can be dis-assembled and the packing renewed without removing the water baffle.

Having thus described my invention, what I claim as new and desire to secure by Letters Patent, is:—

1. In a deep well pump having a plurality of reciprocating plungers, the plunger rods operating one within the other, packing boxes on said plunger rods to prevent leakage and a means for diverting possible leakage from said packing boxes away from the operating mechanism.

2. In a double stroke deep well pump having an outside tubular plunger rod, a packing box on said plunger rod to prevent leakage, an inside plunger rod reciprocally operating within the outside plunger rod and having a packing box to prevent leakage, the two plunger rods reciprocating in alternating opposition, a baffle enclosing said packing boxes and portions of the plunger rods to divert leakage from said packing boxes away from the moving parts of the pump and from the oil reservoirs connected therewith.

3. In combination with a series of plunger rods operated to reciprocate in alternating opposition and having packing boxes positioned suitably to prevent leakage from the interstices between the plunger rods, a trough-shaped baffle partly enclosing said packing boxes and portions of the plunger rods, said baffle to divert leaking fluid from said packing boxes away from the mechanical parts operating in combination with said plunger rods and disposing such leakage into desired channels.

4. In a well pump for pumping water, the combination with a plunger of a stuffing box for the plunger, and means mounted about the stuffing box and extending along the projection of the plunger therefrom, and partially surrounding the plunger and the end of the stuffing box from which the plunger extends, said means serving as a baffle to prevent water that leaks from the stuffing box about the rod from being projected against the operating mechanism for the said rod.

GEORGE E. WILLERS.